UNITED STATES PATENT OFFICE.

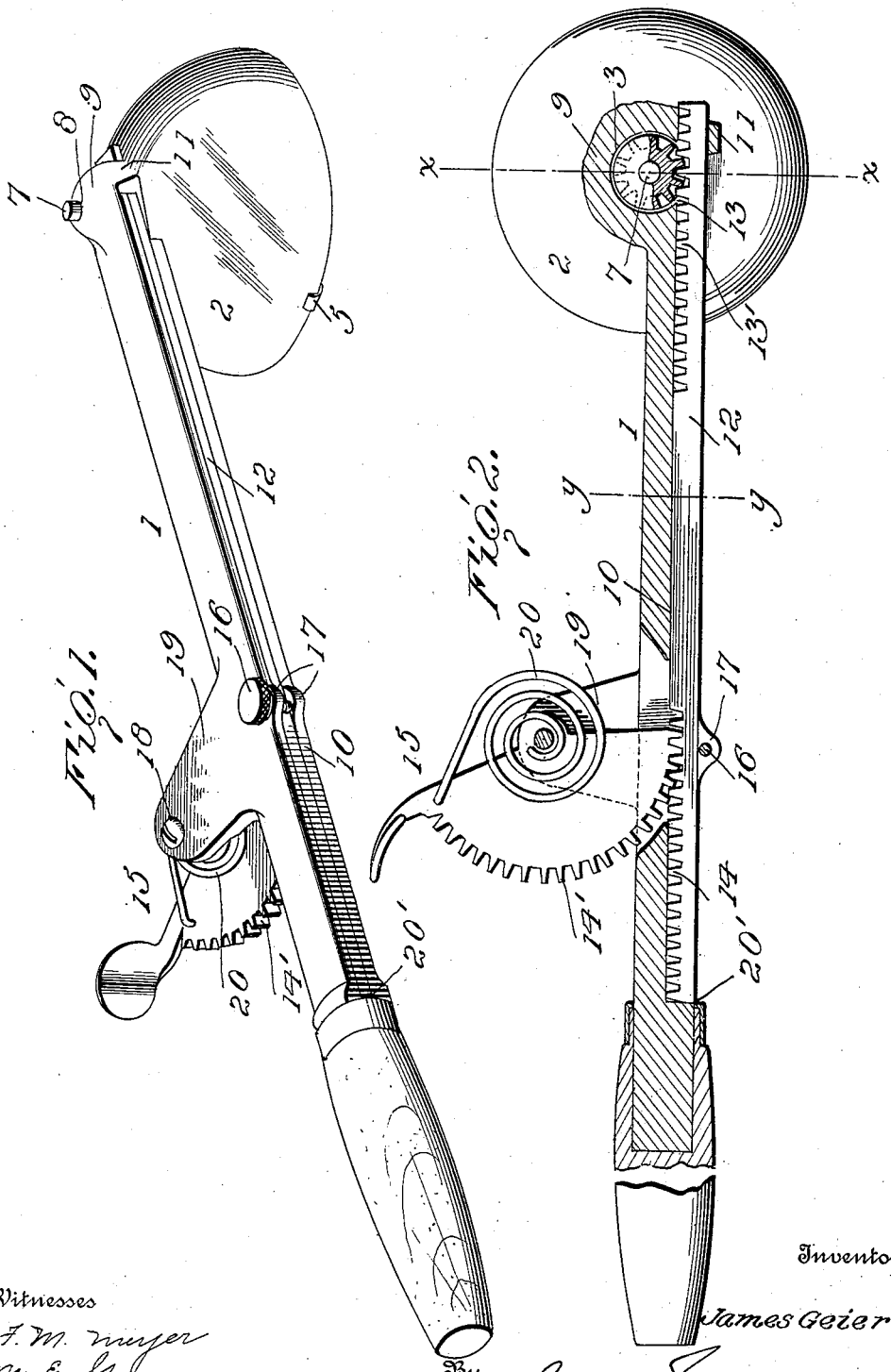

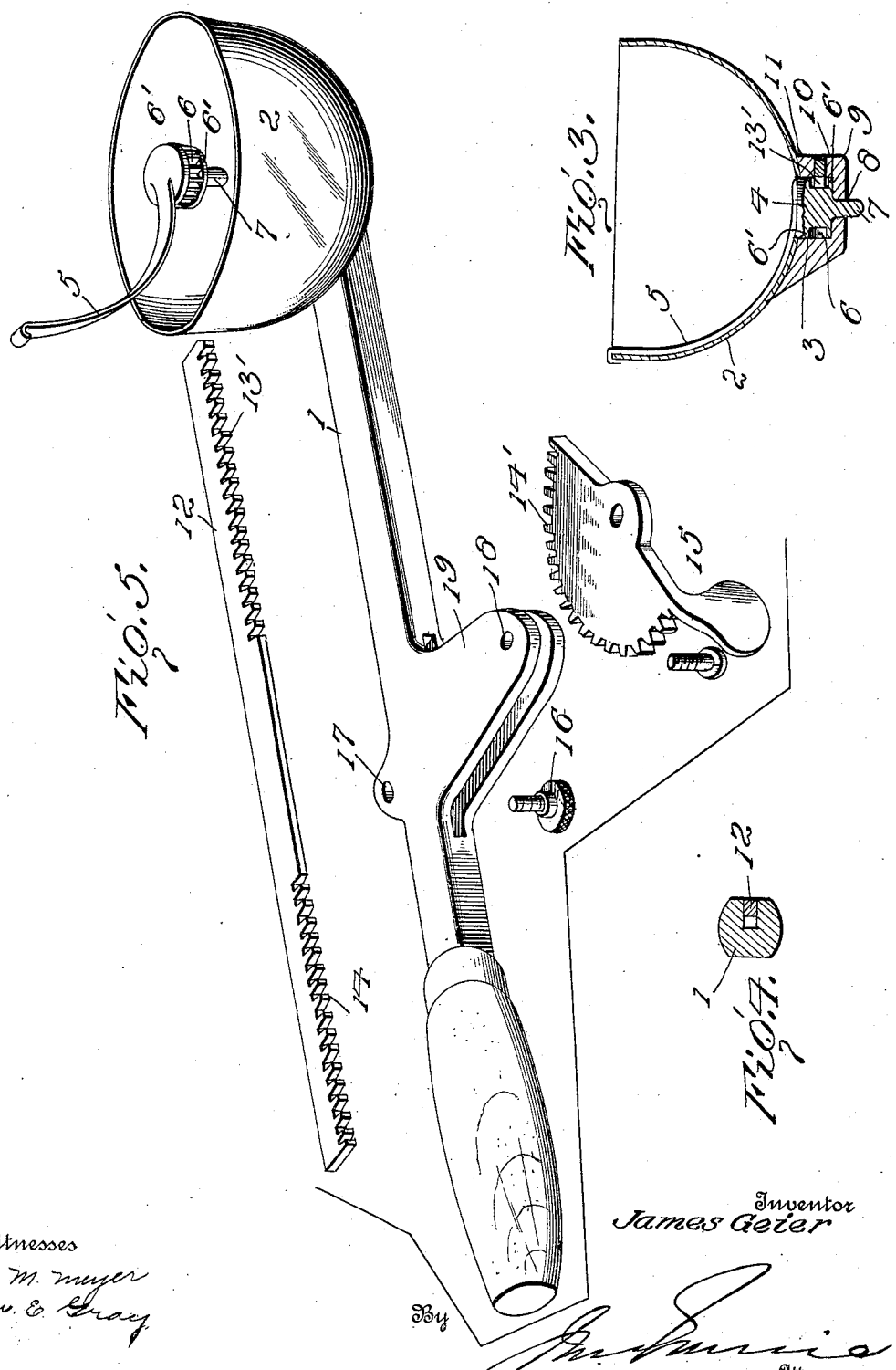

JAMES GEIER, OF TROY, NEW YORK, ASSIGNOR TO CATHERINE NIELSEN AND HENRY S. GILES, OF TROY, NEW YORK.

ICE-CREAM SPOON.

977,382.  Specification of Letters Patent.  Patented Nov. 29, 1910.

Application filed January 11, 1910. Serial No. 537,487.

*To all whom it may concern:*

Be it known that I, JAMES GEIER, a citizen of the Republic of Switzerland, who has filed an application to become a citizen of the United States, residing at Troy, in the county of Rensselaer and State of New York, have invented certain new and useful Improvements in Ice-Cream Spoons, of which the following is a specification.

This invention relates to improvements in ice cream spoons.

The object of the invention is to provide a connection between the operating finger piece and the scraper, which will be concealed and out of the way to prevent the operator's fingers getting caught or pinched when manipulating the spoon, and to further so arrange the parts that they may be conveniently taken to pieces for cleaning the elements, to make the spoon as sanitary as possible.

The invention also relates to improvements in the specific details of construction and arrangement of parts to be hereinafter referred to and particularly pointed out in the claims.

In the drawings: Figure 1 is a perspective view of my improved spoon. Fig. 2 is a horizontal section through the handle and rack and gear. Fig. 3 is a transverse section on the line x—x of Fig. 2. Fig. 4 is a transverse section on the line y—y Fig. 2. Fig. 5 is a perspective view, the parts of the spoon being separated.

1 indicates a handle, and formed integral therewith is a bowl 2. In the bottom of the bowl is a depression 3, in which fits a hub 4, of a scraper 5, and at the bottom of the hub is a pinion 6 provided with upper and lower flanges 6', forming a guideway and extending from the latter is a trunnion 7 having a bearing in an opening 8, in an offset position 9 at the bottom of the point of juncture of the bowl and handle. The outer end of the scraper is bent over the edge of the bowl to act as a guide, as shown at 5.

Formed in one edge of the handle 1 is a longitudinally disposed groove 10 which is open on the side. The open side of the groove adjacent the bottom of the bowl, is closed by a strip 11 to provide a guide for the rack 12. The groove 10 communicates with the opening 3, at the point 13, to permit the teeth of the pinion 6 to engage the teeth 13' of the rack, as clearly shown in Figs. 2 and 3.

The rack 12, reciprocates in the groove 10 and is provided with the teeth 13', at one end which mesh with the pinion 6 and teeth 14 at its opposite end to engage with the teeth 14; of a finger piece 15 which is in the form of a segment. The outer edge of the rack 12 is flush with the outer side surface of the handle 1, and is confined in the groove by the strip 11, and a set screw 16, which passes through threaded openings in the two parallel ears 17, extending from the sides of the handle at a point adjacent the finger operating segment 15.

The finger operating segment 15 is pivotally mounted at 18 between two outwardly extending ears 19. A spiral spring 20 is secured at one end to the pivot 18, and at its opposite end to the finger segment 15 for the purpose of retracting the rack and restoring the scraper to normal position when pressure on the finger segment is released.

When the parts are assembled, the tension of the spring is such that the inner end of the rack will abut against a stop 20', formed at the end of the handle and thereby retain the teeth of the segment and the teeth 14, of the rack in engagement. The set screw acts as a guide against which the outer edge of the rack bears, and thereby prevents the outward pressure of the finger segment forcing the rack out of the groove. By operating the finger segment the rack is forced forward, and through the teeth 13 and pinion 6 the scraper is revolved around in the bowl. In this connection it is to be noted, that I employ but a single scraper arm and that by the gear connection it is revolved completely around the inner surface of the bowl several times which adds greatly to the convenience of releasing the ice cream, particularly if it is unusually hard. Immediately the pressure on the finger segment is released, the spring returns the parts to their normal position.

By constructing the spoon as described it is evident the rack, the pinion and segment at the points engaging therewith, are concealed which will prevent the operator's fingers from being injured, and furthermore, liability of the parts catching or hanging on the can or the clothes when the spoon is handled, is obviated.

To take the parts to pieces for cleaning the set screw is removed, and the rack is moved laterally in its groove to disengage the teeth 14 from the teeth of the segment, and then the rack drawn toward the rear and out of the groove to disengage it from the pinion. The rack having now been taken out the scraper and its pinion can be removed from the bowl 2. The scraper, bowl and rack being now separated, they can be individually cleaned which is advantageous from a sanitary standpoint. The set screw is depended upon as the locking means for holding the parts in assembled form, as will be readily understood by reference to the drawing.

What I claim is:

1. An ice cream spoon comprising a bowl, a scraper operating in the bowl, a gear on the bottom of the scraper, a handle formed with a longitudinal groove in one side thereof, a rack bar engaging the gear and fitting in the groove and adapted to slide lengthwise therein, detachable means engaging the outside of and holding the rack bar in the groove and against the wall of the latter, a pivotally mounted finger piece having teeth which engage the rack bar, and a spring for holding the finger piece of rack bar in normal position.

2. An ice cream spoon comprising a handle, formed with a longitudinal groove in one side thereof, a rack bar fitting in the groove and adapted to slide lengthwise therein, detachable means engaging the outside of and holding the rack bar in the groove and against the wall of the latter, a pivotally mounted segmental rack engaging the rack bar, a spring for holding the pivotally mounted segmental rack and rack bar in normal position, a bowl at the end of the handle and formed with a depression which communicates with the groove in the handle, a scraper in the bowl and a pinion on the scraper which fits in the depression and engages with the rack bar.

3. An ice cream spoon comprising a handle formed with a longitudinal open groove interrupted by a strip near one end to provide a guide, a rack bar fitting in the groove and adapted to slide lengthwise therein, a stop to limit the rearward sliding movement of the rack bar, a detachable locking device on the handle which engages the outside of the rack bar to hold said rack bar in the groove, and against the wall of the latter, a pivotally mounted segment for operating the rack bar, a spring for returning the segment to normal position and the rack bar against its stop, a bowl, a scraper therein, and a pinion on the scraper with which the sliding rack bar engages.

4. An ice cream spoon comprising a handle formed with a longitudinal open groove interrupted by a strip near one end to provide a guide, a rack bar fitting in the groove, and adapted to slide lengthwise therein, a stop to limit the rearward sliding movement of the rack bar in the groove, ears extending from the handle, a set screw operating in the ears and against which the outer edge of the rack bar engages to confine the latter in the groove and hold said rack bar against the wall of the groove, a pivotally mounted segment operating the rack bar, a spring for returning the segment to normal position and the rack bar against its stop, a bowl, a scraper consisting of a single arm operating in the bowl, and a pinion on the scraper with which the rack bar engages.

5. An ice cream spoon comprising a bowl formed with a depression and a centrally disposed opening, a scraper operating in the bowl, a pinion and trunnion on the bottom of the scraper, the pinion fitting in the depression and the trunnion fitting in the opening, a handle formed with and extending from the bottom of the bowl, said handle having a longitudinally disposed groove, a rack bar operating in the groove and adapted to slide lengthwise therein and engaging the pinion, a pivotally mounted finger segment engaging the rack bar, a spring for holding the same in normal position, and a set screw on the handle which engages the outside edge of the rack bar to retain the rack bar in the groove and against the wall thereof.

6. An ice cream spoon comprising a bowl, a handle formed with a groove, a single scraper operating in the bowl and which is bent at its upper end to engage over the upper edge of said bowl to provide a guide, a gear on the bottom of the scraper, a rack fitting in the groove in the handle and adapted to slide lengthwise therein and engaging the gear, a pivotally mounted finger piece formed with teeth to engage the rack, and a spring for holding the finger piece and rack bar in normal position.

In testimony whereof I affix my signature in presence of two witnesses.

JAMES GEIER.

Witnesses:
L. H. GILES,
R. NIELSEN.